US010301071B2

(12) United States Patent
Mockler

(10) Patent No.: US 10,301,071 B2
(45) Date of Patent: May 28, 2019

(54) ARRANGEMENT CONTAINER SYSTEM

(71) Applicant: Edible Arrangements, LLC, Wallingford, CT (US)

(72) Inventor: Cynthia Mockler, North Haven, CT (US)

(73) Assignee: Edible IP, LLC, Wallingford, CT (US)

( * ) Notice: Subject to any disclaimer, the term of this patent is extended or adjusted under 35 U.S.C. 154(b) by 32 days.

(21) Appl. No.: 14/661,554

(22) Filed: Mar. 18, 2015

(65) Prior Publication Data

US 2016/0009452 A1 Jan. 14, 2016

Related U.S. Application Data

(60) Provisional application No. 61/955,198, filed on Mar. 18, 2014.

(51) Int. Cl.
*A47G 7/06* (2006.01)
*B65D 25/02* (2006.01)
*B65D 13/02* (2006.01)
*B65D 85/50* (2006.01)
*A47G 7/08* (2006.01)
*A01G 5/04* (2006.01)

(52) U.S. Cl.
CPC .............. *B65D 25/02* (2013.01); *A47G 7/08* (2013.01); *B65D 13/02* (2013.01); *B65D 85/50* (2013.01); *A01G 5/04* (2013.01)

(58) Field of Classification Search
CPC ........ B65D 25/02; B65D 25/04; B65D 85/50; B65D 85/505; B65D 85/52; B65D 21/00; B65D 21/02; B65D 25/103; B65D 25/106; B65D 25/107; B65D 13/02; A01G 9/02; A01G 9/021; A01G 5/04; A47G 7/00; A47G 7/02; A47G 7/06; A47G 7/025; A47G 7/08; A47G 2007/003; A47G 2007/066
USPC ........... 206/423, 514; 220/23.89, 23.87, 528, 220/23.83
See application file for complete search history.

(56) References Cited

U.S. PATENT DOCUMENTS

| | | | |
|---|---|---|---|
| 4,741,441 A * | 5/1988 | Keffeler | A61J 1/03 206/532 |
| 4,941,572 A * | 7/1990 | Harris | B65D 85/505 206/204 |
| 5,011,018 A * | 4/1991 | Keffeler | B65D 83/0445 206/532 |
| 5,815,905 A * | 10/1998 | Weder | A01G 5/04 29/469.5 |
| 5,870,856 A * | 2/1999 | Friend | A01G 9/02 47/65.7 |
| 6,591,550 B2 * | 7/2003 | Gilbert | A01G 5/06 206/423 |

(Continued)

*Primary Examiner* — Robert Poon
(74) *Attorney, Agent, or Firm* — Troutman Sanders, LLP; Christopher C. Close, Jr.

(57) ABSTRACT

The present invention encompasses a system which enables arrangements of various shapes and sizes to be packaged for delivery and transport utilizing a standard container. Systems in accordance with the present invention utilize a first and second container each capable of receiving a foam base utilized in the creation of an arrangement of a predetermined size. The first and second containers are of different sizes so that one may nest inside the other. Once nested, the containers form a locking engagement with one another.

13 Claims, 5 Drawing Sheets

(56) References Cited

U.S. PATENT DOCUMENTS

| | | | |
|---|---|---|---|
| 2007/0228054 A1* | 10/2007 | Woodhouse | A47G 7/07 220/719 |
| 2010/0032431 A1* | 2/2010 | Schatz | D06F 95/002 220/23.87 |
| 2010/0170154 A1* | 7/2010 | Ahn | A47G 7/025 47/71 |
| 2013/0125361 A1* | 5/2013 | Ullrich | B65D 5/48 29/401.1 |
| 2014/0069006 A1* | 3/2014 | Nicolay | A01G 9/02 47/65.5 |

* cited by examiner

ARRANGEMENT CONTAINER SYSTEM

FIELD OF THE INVENTION

The present invention relates to a packaging system for preparing arrangements such as fruit and floral arrangements, and in particular relates to a packaging system which enables arrangements of various shapes and sizes to be packaged for delivery and transport utilizing a standard container.

BACKGROUND OF THE INVENTION

In the floral and fruit arrangement industries, assortment of items are prepared and presented in a distinguished manner to appear favorably to a recipient. In particular in the fruit arrangement business, Edible Arrangements® creates artful arrangements of fruit assortments. These fruit assortments consist of multiple pieces of cut fruit which are positioned on a foam base. The cut fruit is arranged in both vertical and horizontal space to create elaborate presentations of the cut fruit. These arrangements are provided in various sizes and shapes depending on the amount of fruit utilized in establishing the particular arrangements. Accordingly, as these cut fruit pieces are arranged primarily utilizing skewers for impaling the fruit and securing the fruit into a secure position in the arrangement the arrangements the allocation of foam required also increases.

Consequently, the larger the arrangement, the more foam is required and ultimately the heavier and wider the arrangement becomes. In some situations the arrangements may range from 2-6 pounds of fruit. To accommodate the various sizes of edible bouquets various sized containers are utilized for securing the foam into position establishing a structurally sound bouquet. As multiple containers are required, the inventory of containers becomes large requiring sunken inventory costs and the risk of having an inadequate amount of the correct sized containers in stock depending on the particular demand for a particular type of bouquet. To minimize the direct one-to-one correlation of a particular sized container for a particular sized arrangement, an improved system is desired for minimizing inventory costs by providing a system which may accommodate various sized arrangements utilizing an improved container system. Accordingly, it is an object of the present invention to provide for an improved container system to accommodate arrangements of various sizes.

SUMMARY OF THE INVENTION

The present invention encompasses a packaging or container system which enables arrangements of various shapes and sizes to be packaged for delivery and transport utilizing a standard container. Containers in accordance with the present invention may be formed from plastic, ceramic, glass, epoxy resin, wood, metal or any other materials known in the art.

Systems in accordance with the present invention may utilize a first and second storage device each capable of receiving a foam base utilized in the creation of an arrangement of a predetermined size. The first and second storage devices are of different sizes so that one my nest inside the other. Once nested, the storage devices form a locking engagement with one another.

One embodiment of the present invention includes a primary container having a bottom, sidewalls and an upper opening defining a reservoir having a first volume; an insert adapted for being received within the reservoir of the primary container; said insert defining a container having a bottom, sidewalls and an upper opening defining a reservoir having a second volume smaller than said first volume for receiving an arrangement.

Another embodiment of the present invention includes a primary container having a bottom, sidewalls and an upper opening defining a reservoir having a first volume for receiving an arrangement of a first size; an insert adapted for being received within the reservoir of the primary container; said insert defining a container having a bottom, sidewalls and an upper opening defining a second reservoir having a second volume smaller than said first volume for receiving an arrangement of a second size, wherein said insert is adapted for locking engagement with said primary container.

A further embodiment of the present invention contemplates a system for providing a decorative arrangement comprising a first container, said container adapted to form a locking engagement with a second container a second container of a size small enough to fit within the first container, said second container adapted to form a locking engagement with the first container wherein the first container comprises openings for receiving tabs from the second container.

DETAILED DESCRIPTION

Figure 1:
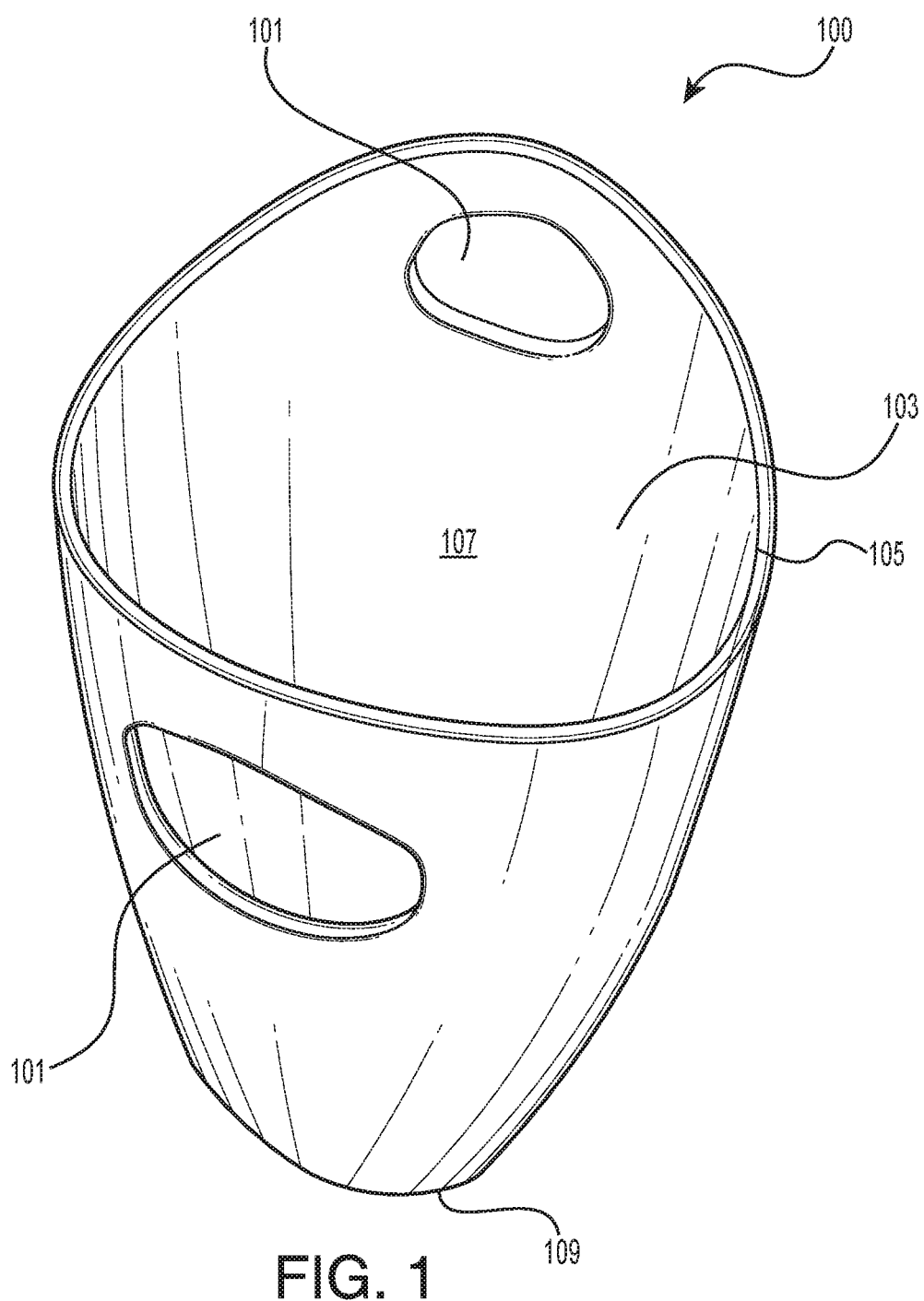
FIG. 1 shows a primary base in accordance with the present invention.
Figure 2:
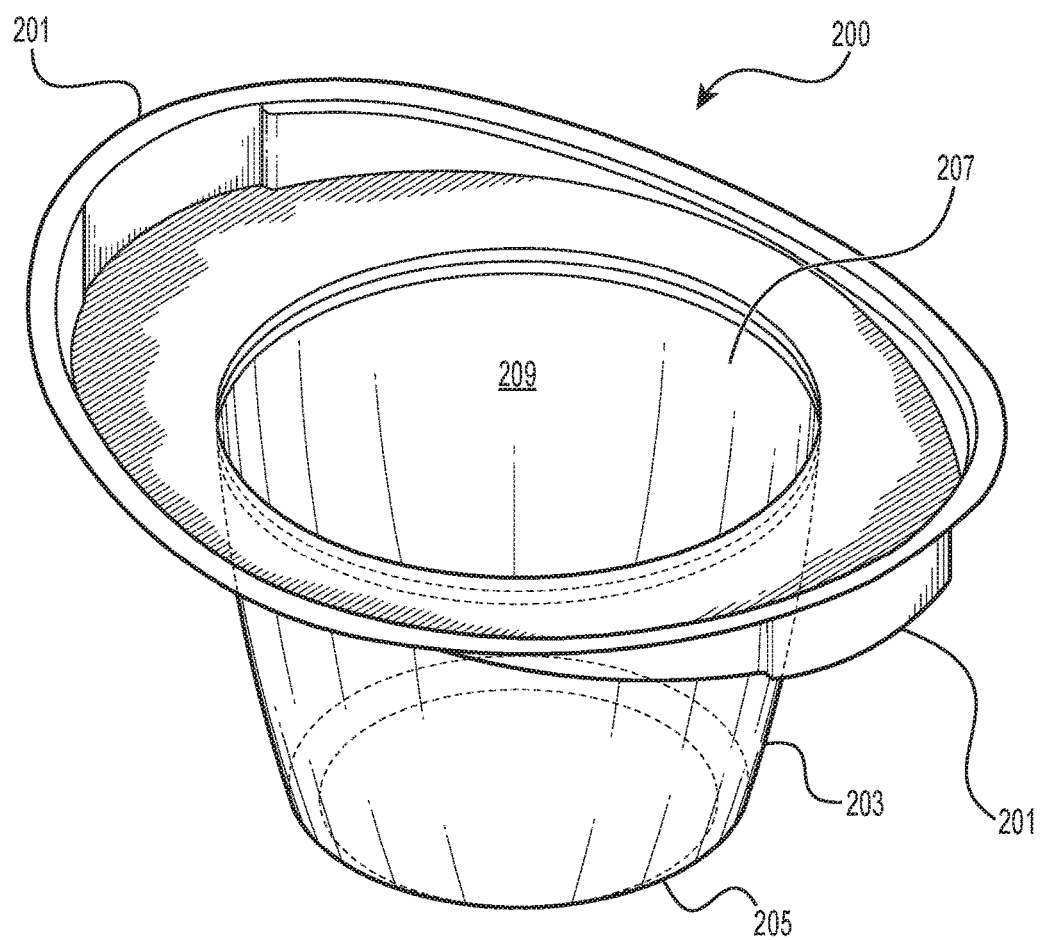
FIG. 2 shows a second container adapted for integration into the primary base.
Figure 3:
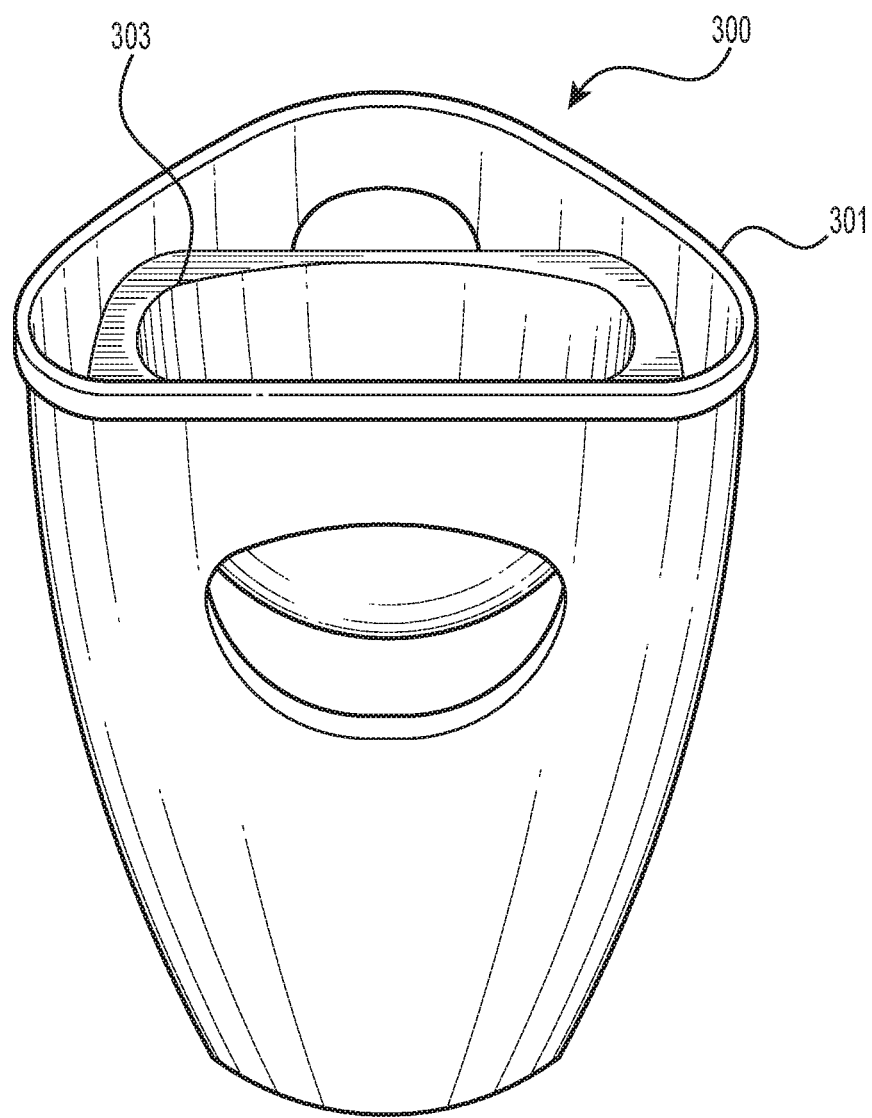
FIG. 3 shows a locking engagement in accordance with the present invention.
Figure 4:
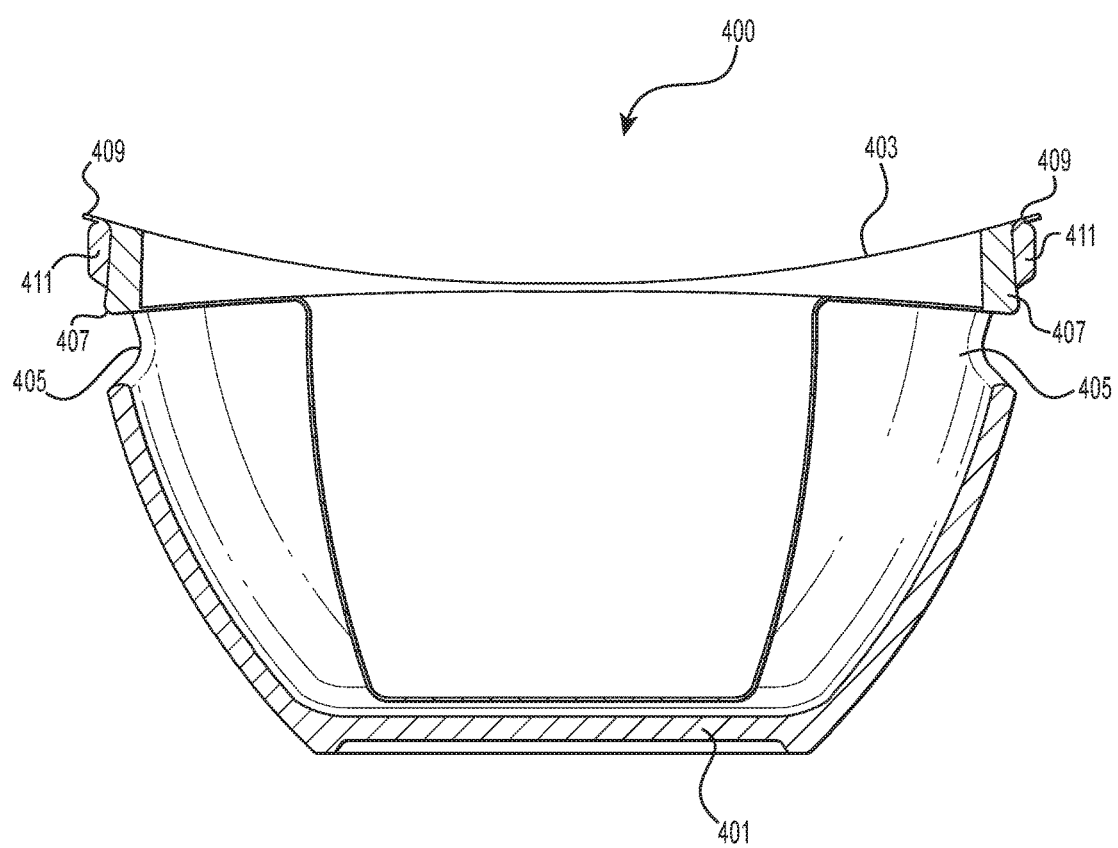
FIG. 4 shows two interlocked containers in accordance with the present invention.
Figure 5:
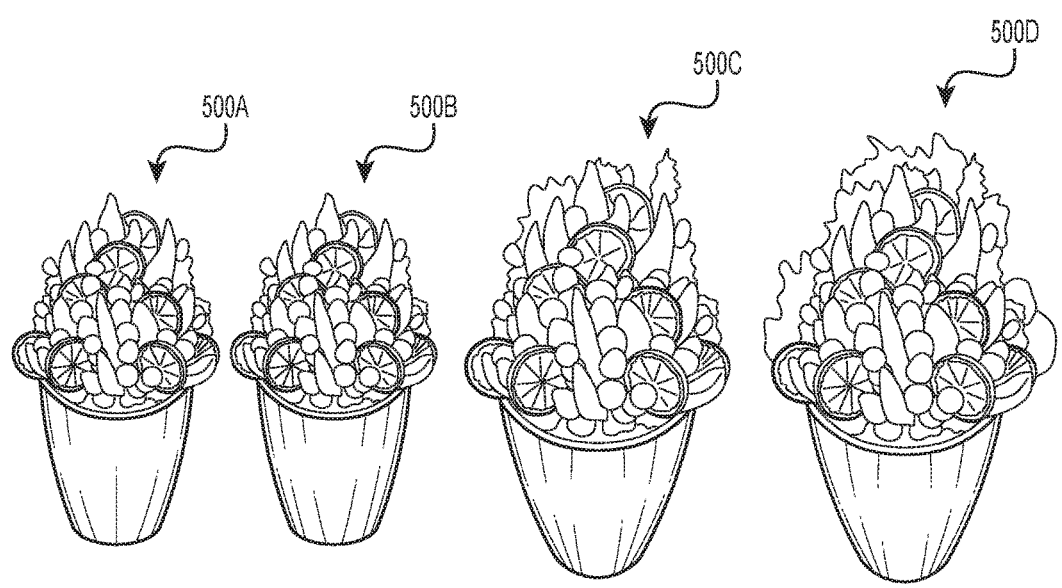
FIG. 5 shows an embodiment of the present invention.

The present invention provides a first 100, 301, 401 and second 200, 303, 403 storage device each capable of receiving a foam base utilized in the creation of an arrangement of a predetermined size. The second 200, 303, 403 device is of a size that will fit inside the first 100, 301, 401 device. The storage devices form a locking engagement with one another. This locking engagement is formed via any known mechanism of locking including, but not limited to male/female press fit mechanisms, clip and receiver, interfering mechanisms, tongue-in-grove mechanisms, tabs, or any other interlocking mechanism known in the art.

Systems 300 in accordance with the present invention may incorporate a rigid container 100, 301, 401 forming a primary base 109 having sidewalls 103 defining a particular volume 107 in combination with a secondary container 200, 303, 403 adapted for integration with the primary base which also has sidewalls 203, 207 for providing for a smaller volume 209. The secondary adapter/container is configured for locking into place with the primary rigid container.

In the preferred embodiment, the system utilizes a first and second storage device each capable of receiving a foam base utilized in the creation of an arrangement of a predetermined size. In particular the arrangement typically consists of items which are positioned in a vertical manner spreading out over a general area. Examples of such arrangements are known in the art. These arrangements are heavy and require strong foundations to support the vertical positioning of the components of the arrangements. In particular some of these arrangements are over a foot in height moving the center of gravity of the arrangements at a position above the lip 105 of a respective container. Accordingly the base of the container must be sufficiently broad in order to properly balance the arrangements. Accordingly the base containers may be ceramic or any other material that provides a very stable footprint sufficient to provide support to the arrangements. In the preferred embodiment the base containers have a bottom, sidewalls and an upper opened top for receiving structural arrangement support items. Typically the structural arrangement support items consist of foam blocks which are securely positioned within the interior of the case containers. The foam blocks are typically wedged into position compressed against the interior of the container sidewalls. The foam blocks subsequently receive stems or skewers which contain displayed items such as fruit or possibly flowers 500A, 500B, 500C, 500D. The amount of foam utilized is dependent on the overall size of the desired arrangement with more foam being required for wider arrangements. In this configuration, a primary base container is provided which may be singularly utilized for providing a base for a predetermined sized arrangement. To construct the desired arrangement, the desired foam would be utilized and the arrangement comprised of the respective skewers and displayed items would be arranged. According to the invention, should a smaller shaped and sized arrangement be desired, in lieu of a second base 205 being utilized, a lighter plastic molded adapter or insert is positioned within the interior of the primary base container. The secondary adapter or insert may have a flange for interconnecting with the primary base. The flange may provide for an interlocking device for interlocking with the primary base providing a secure reservoir for supporting a second sized arrangement. The secondary adapter 403 may have a laterally extending surface for taking up the unused space of the primary base container. The secondary adapter 403 contains a second reservoir of smaller volume of the primary base for receiving foam for forming a smaller arrangement. Preferably the second reservoir has a central axis which is concentrically aligned with the primary base reservoir maintaining the center of gravity of the arrangement with the center of the primary base. The laterally extending surface may form a lip 409 for attaching to the upper profile 411 of the primary base 401. In an embodiment 400, the primary base 100, 301, 401 includes opposing positioned openings 101, 405 for receiving tabs 201, 407 formed at opposing ends of the secondary adapter 200, 303, 403. The tabs 201, 407 are constructed to lock into place with the respective openings 101, 405 of the primary base 100, 301, 401 providing for a secure fit. If desired the secondary adapter or insert 403 may be removed once the arrangement has been provided to the consumer and the arrangement has endured its expected time of usefulness. Accordingly in operation it may be seen that a packaging system may be had for the arrangement industry wherein multiple sized arrangements may be packaged for delivery utilizing a primary base having a first volume for receiving an arrangement and a secondary adapter or insert which is adapted for locking engagement with the primary base providing for a second volume smaller than the first for receiving an arrangement of a smaller size.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

I claim:

1. A container comprising:
a primary container having a bottom, sidewalls and an upper opening defining a reservoir having a first volume, wherein the primary container further comprises at least two openings on the sidewalls;
a secondary container adapted for being received substantially completely within the reservoir of the primary container;
wherein said secondary container includes a bottom, sidewalls and an upper opening defining a second reservoir having a second volume smaller than said first volume, wherein said secondary container has a locking engagement further comprising a flange having at least two tabs positioned on opposite ends of the secondary container and a lip spaced apart from the two tabs, the locking engagement configured such that the at least two tabs engage with the at least two openings on the sidewalls of said primary container and the lip engages with an upper profile of the primary container while the secondary container is substantially completely received within the primary container, and wherein the secondary container further comprises a foam base.

2. The container of claim 1, wherein the primary container is ceramic.

3. The container of claim 1, wherein the secondary container is plastic.

4. The container of claim 1, wherein the locking engagement is selected from the group consisting of a male/female press fit mechanism, a clip and receiver mechanism, an interfering mechanism, a tongue-in-grove mechanism, a tab-based mechanism, and a flange based mechanism.

5. A system for providing a decorative arrangement comprising:
a first container;
a second container comprising a flange including at least two tabs formed in the flange and positioned on opposite ends of the second container, said first container adapted to form a locking engagement with the second container, wherein said first container comprises at least two openings for receiving the at least two tabs, the second container further comprising a lip, spaced apart from the at least two tabs and configured to engage with an upper profile of the first container, wherein the second container is of a size small enough to fit within the first container, and wherein the second container is substantially completely received within the first container when forming the locking engagement with the first container; and
a foam insert comprised within said second container.

6. The system of claim 5, wherein the first container is ceramic.

7. The system of claim 5, wherein the second container is plastic.

8. The system of claim 5, wherein the locking engagement comprises a male/female press fit mechanism.

9. The system of claim 5, wherein the locking engagement comprises a tongue in groove mechanism.

10. The system of claim 5, wherein the locking engagement comprises the flange.

11. The system of claim 5, wherein the locking engagement is selected from the group consisting of a male/female press fit mechanism, a clip and receiver mechanism, an interfering mechanism, a tongue-in-grove mechanism, a tab-based mechanism, and a flange based mechanism.

12. The container of claim 1, wherein the primary container is rigid.

13. The container of claim 5, wherein the first container is rigid.

* * * * *